US012729633B2

(12) United States Patent
Patel

(10) Patent No.: US 12,729,633 B2
(45) Date of Patent: Sep. 8, 2026

(54) LOW-GRADE WASTE HEAT RECOVERY SYSTEM USING STORED HYDROPOWER

(71) Applicant: Dhaval T. Patel, Louisville, KY (US)

(72) Inventor: Dhaval T. Patel, Louisville, KY (US)

( * ) Notice: Subject to any disclaimer, the term of this patent is extended or adjusted under 35 U.S.C. 154(b) by 0 days.

(21) Appl. No.: 18/670,222

(22) Filed: May 21, 2024

(65) Prior Publication Data

US 2024/0318594 A1 Sep. 26, 2024

Related U.S. Application Data

(60) Provisional application No. 63/453,509, filed on Mar. 21, 2023.

(51) Int. Cl.
*F01K 25/02* (2006.01)
*F03B 13/06* (2006.01)

(52) U.S. Cl.
CPC .............. *F01K 25/02* (2013.01); *F03B 13/06* (2013.01)

(58) Field of Classification Search
CPC ....................................................... F01K 25/02
See application file for complete search history.

(56) References Cited

U.S. PATENT DOCUMENTS 3,953,971 A * 5/1976 Parker ....................... F03G 7/04 60/671
4,193,267 A * 3/1980 Loeb ....................... F03G 7/005 290/1 R
5,488,828 A * 2/1996 Brossard ................. F03G 3/096 60/641.6
6,412,281 B2 * 7/2002 Cover ................... F03G 6/0055 60/670
6,434,942 B1 * 8/2002 Charlton ................. F03G 6/068 60/641.11
8,341,961 B2 * 1/2013 Glynn ....................... C02F 1/14 60/641.11
10,060,299 B2 * 8/2018 Al Ghizzy .............. F01K 23/04
10,787,937 B2 * 9/2020 Lindner .................. F01K 21/04
11,512,402 B2 * 11/2022 Bairamijamal ......... C07C 41/01
2010/0052333 A1 * 3/2010 Andrews ................... F02C 3/20 290/1 A
2010/0199667 A1 * 8/2010 Ullman ................... F03B 13/00 60/671
2014/0069078 A1 * 3/2014 Tong ....................... F01K 23/10 60/692
2014/0298806 A1 * 10/2014 Jeter ....................... F03G 6/066 60/645
2018/0094548 A1 * 4/2018 Jeter ........................ C10G 7/00

FOREIGN PATENT DOCUMENTS

WO WO-2015118282 A1 * 8/2015 .............. F01K 11/02

* cited by examiner

*Primary Examiner* — Thomas E Lazo
(74) *Attorney, Agent, or Firm* — FBT Gibbons LLP

(57) ABSTRACT

A low-grade waste heat ("LGWH"), closed-circuit recovery system includes a storage chamber, a condenser, and a turbine. In the storage chamber, a working fluid, exposed to a waste heat source, is heated to vapor form and sent to a condenser at a higher elevation, where the working fluid is cooled. Upon condensation, the working fluid is dropped down onto a hydraulic turbine, the rotation of which generates power. The working fluid vapor can likewise cause rotation of a gas turbine.

8 Claims, 7 Drawing Sheets

LOW-GRADE WASTE HEAT RECOVERY SYSTEM USING STORED HYDROPOWER

CROSS REFERENCE TO RELATED APPLICATION

This patent application claims the benefit of U.S. Provisional Patent Application Ser. No. 63/453,509 filed on Mar. 21, 2023, and entitled Low-Grade Waste Heat Recovery System Using Stored Hydropower, the disclosure of which is hereby incorporated by reference herein in its entirety.

TECHNICAL FIELD

Embodiments of the technology relate to a cooling mechanism for waste heat, particularly low-grade waste heat (LGWH), in addition to its conversion into electricity using hydropower/stored hydropower technology, in addition to gas turbines and elevated condensers.

BACKGROUND

Rising costs of electricity, dwindling fossil fuel reserves, and spiraling consequences due to global warming require us to seek alternative sources of energy and other solutions to mitigate the same. In 2021, according to Ourworldindata.org, the world generated approximately 27,500 TWh of electricity and emitted 442 g $CO_2$ for each KWh of electricity produced. According to the IEA, this output resulted in 36.3 billion tons of $CO_2$ emissions.

Waste heat is normally heat that is discharged to the environment while operating a process. The temperature of waste heat with industrial processes ranges from 30° C. to more than 1000° C. LGWH refers to heat below 100° C., and it is estimated that 63% of waste heat falls into the category of LGWH. The emission of low-grade waste heat into the environment each year is staggering. In 2021, according to the U.S. Energy Information Administration, approximately 30 quadrillion BTU of non-renewable energy were used to generate 900 TWh of electricity in the U.S., 75% of which (22.6 quadrillion BTU) was lost during electricity generation as LGWH. Based on data from 2016-2020, an additional 5% was lost during transmission and distribution. In India, for example, the transmission and distribution loss has exceeded 20%. In a warming climate, higher temperatures will result in even greater LGWH loss via transmission and distribution, representing a destructive cycle. Nonetheless, there are currently few commercially available solutions for recovery and utilization of LGWH, as such efforts are often not viable or cost effective.

Additionally, the 2018 International Energy Outlook, issued by the U.S. Energy Information Administration, projected that the world energy consumption will reach up to 736 quadrillion BTU in 2040, with more than 50% of this expected consumption being attributed to the industry sector. For example, according to Statista.com, in 2021, approximately 191 TWh of electricity was used by the global data center industry, and about 30% of this consumption was attributed to cooling (i.e. waste heat). In 2020, the Power Usage Effectiveness (PUE) rating for the average large data center was 1.59, where anything above 1.0 relates to processes ancillary to IT (e.g., cooling). Data centers and high-rise buildings, among other facilities for various industries, require significant cooling resources to manage large quantities of electricity and the associated transmission and distribution thereof.

Worldwide, many governments are mandating improvements in industrial energy efficiency necessitating new technologies to solve these problems. Some governments, for example, have enacted policies to pressure industries into finding ways to recover more waste heat.

Current solutions, however, are not without flaws. For example, according to Physics World in 2020, photovoltaic panels currently produce more than 600 GW of power worldwide, with an expected increase to 3,000 GW by 2030, but such panels only convert 6-25% of absorbed sunlight into electric current, while the rest is transformed into LGWH. Solar panels are limited in their ability to generate electricity during the evening, despite the demand for the same, and can lose efficiency due to overheating, which can occur at midday when solar irradiance is the greatest. Such overheating can lead to the degradation of photovoltaic cells, and thus, shortening of their lifespan. Moreover, few options exist to store power for use later in the day, and again, there are limited solutions for converting LGWH from solar panels into electricity.

Hydropower is a safe, reliable method of producing electricity. Most sources of hydropower are already utilized, however, and they are not widely available where electricity is needed. Pumped hydropower can be used to create a store of hydropower (i.e., pumping water into an elevated aquifer for use during periods of higher demand), but it is inefficient. Such processes often consume more power to lift the water than the power it generates, and thus, it is only economical in certain situations.

In view of the above, improved methods and systems for efficient recovery of LGWH are desired. Water and other substances will vaporize at temperatures normally categorized as LGWH at various pressures, sub-atmospheric to above atmospheric.

Vapor will passively rise to a higher elevation before condensing and falling back to a lower elevation, as colder temperatures naturally exist at higher elevations. This cycle can be utilized to rotate a turbine.

Water vapor is the most abundant greenhouse gas in the atmosphere. However, its concentration becomes almost zero in the stratosphere. A hotter planet enables a greater amount of water vapor to exist in the air. This creates a positive feedback loop whereby increased temperatures result in an increased greenhouse effect.

SUMMARY

In accordance with one embodiment, a LGWH recovery system includes at least one primary storage chamber including a working fluid and configured to receive heat from a heat source to heat the working fluid from a liquid form to a vapor form; a condenser fluidly connected to the at least one primary storage chamber and configured to receive the working fluid in vapor form and cool the working fluid back to liquid form; a primary turbine fluidly connected to the condenser and configured for rotation caused by descent of the working fluid from the condenser; and a return duct configured to receive the working fluid passing through the turbine and return the working fluid to the at least one primary storage chamber; wherein the LGWH recovery system is a closed system.

In accordance with another embodiment, a low-grade waste heat LGWH recovery system includes a primary storage chamber comprising a working fluid and configured to receive waste heat from a heat source to heat the working fluid from a liquid form to a vapor form; a floating condenser movable between a first position, at which the floating condenser is configured to receive the working fluid in vapor form from the primary storage chamber, and a second position, the floating condenser being configured to cool the working fluid back to liquid form; two or more secondary storage chambers, each of the secondary storage chambers configured to receive the working fluid from the floating condenser at a different position between the first and second positions; a primary turbine configured to receive the working fluid from at least one of the two or more secondary storage chambers and configured for rotation caused by descent of the working fluid therefrom; wherein the LGWH recovery system is a closed system.

In accordance with yet another embodiment, a low-grade waste heat LGWH recovery system includes at least one primary storage chamber comprising a working fluid and configured to receive heat from a heat source to heat the working fluid from a liquid form to a vapor form; a condenser fluidly connected to the at least one primary storage chamber and configured to receive the working fluid in vapor form therefrom via a first insulated column fluidly connecting the primary storage chamber with the condenser, the condenser being configured to cool the working fluid back to liquid form; a secondary storage chamber fluidly connected to the condenser and configured to receive working fluid in liquid form therefrom; a primary turbine fluidly connected to the secondary storage chamber and configured for rotation caused by descent of the working fluid from the secondary storage chamber via a second insulated column configured to guide the working fluid in liquid form from the secondary storage chamber to the primary turbine; and a return duct configured to receive the working fluid passing through the turbine and return the working fluid to the at least one primary storage chamber; wherein the LGWH recovery system is a closed system.

Embodiments of a LGWH recovery system powered by waste heat are disclosed. In an embodiment, embodiments of a closed-circuit system and a waste heat source are disclosed. The LGWH recovery storage system can include a lower storage chamber wherein lies the working fluid and the heating element from the waste heat source. A column (optionally connected to a gas turbine) connects this chamber to an elevated condenser and an upper storage chamber. Vaporized working fluid travels up the vertical pipe and condenses at a higher elevation in the condenser, where the liquid is subsequently transferred to the upper storage chamber. The upper storage chamber can regulate the flow of working fluid, such that liquid from the upper storage chamber can be released therefrom to fall through a hydraulic turbine to generate power before re-entering the lower storage chamber.

In an embodiment, the pressure in this closed system can be modified to control the boiling point of the working fluid to be below the temperature of the LGWH and above the temperature of the condenser.

In an embodiment, various mechanisms can be used to expedite the rate of flow of the vapor or liquid such as fans.

In an embodiment, various mechanisms can be used to expedite the cooling across the condenser, whether active or passive.

In an embodiment, various active mechanisms can be used to expedite and/or regulate the flow of the working fluid into the lower chamber such as with a pump.

In an embodiment, various aspects can be modified to enhance the final output. For example, the height of the entire closed system can be increased to take advantage of colder temperatures at higher elevations as well as to gain greater "head" for greater electricity output. For example, the entire structure can be molded to an existing hill or mountain as shown in FIG. 2.

BRIEF DESCRIPTION OF THE DRAWINGS

The present disclosure will be more readily understood from a detailed description of some example embodiments taken in conjunction with the following figures.

DETAILED DESCRIPTION

Figure 1:
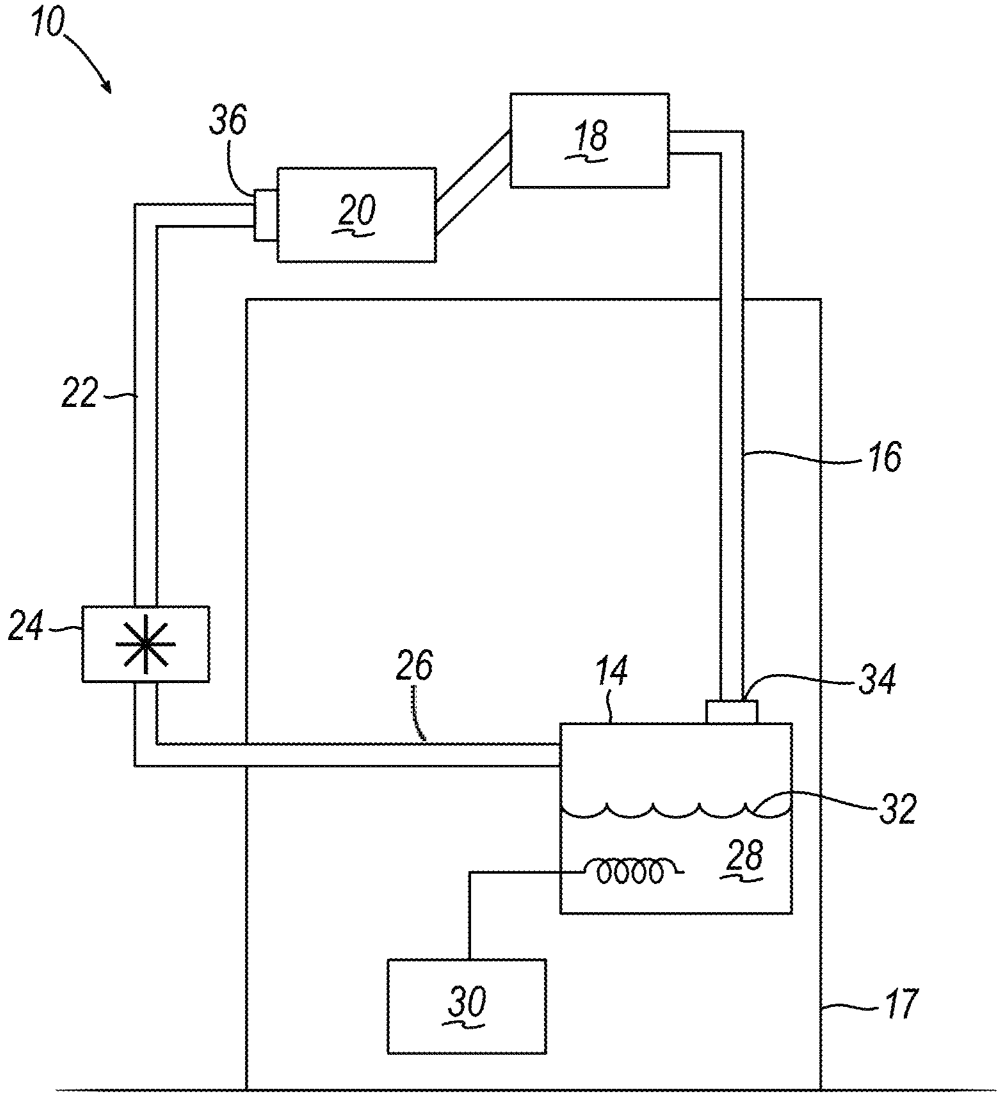
FIG. 1 depicts a schematic view of a LGWH recovery system powered by waste heat, in which liquid working fluid can be circulated to rotate a turbine.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiment," "one example embodiment," or "in an embodiment" in place throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of a LGWH recovery system using hydropower that can, when used as described herein, provide lower cost hydroelectricity anywhere LGWH is available and an elevated reservoir can be built above a turbine. While conventional hydropower systems utilize an "open" water cycle to generate reliable, renewable, low-carbon electricity, the LGWH recovery system can include a "closed" cycle, for water or another fluid that can utilize one or more working fluids and a variable pressure system to recover energy from LGWH over a range of LGWH temperatures and variable ambient temperatures.

As shown in FIG. 1, the LGWH recovery system 10 can include a lower storage chamber 14, a [first] column 16, a condenser 18, an upper storage chamber 20, a second column/conduit 22, a turbine 24, and a return duct 26. The LGWH recovery system 10 can be a closed system. The lower storage chamber 14 can contain a working fluid 28 and can be associated with an LGWH source 30. The LGWH source 30 can be connected directly to the lower storage chamber 14 via cooling coils from a compressor or indirectly via an intermediate stage or through the wall of the lower storage chamber. The lower storage chamber 14 can receive heat from the LGWH source 30 to heat the working fluid 28 from a liquid form to a vapor form.

Suitable examples of working fluids 28 can include water, various freons, or mixtures thereof. A suitable freon has low environmental impact, good material compatibility, low heat of vaporization, and acceptable boiling properties. In one embodiment, the working fluid is water. The working fluid 28 may comprise a portion of a volume of the lower storage chamber 14, such that at least a portion of a remaining volume of the lower storage chamber 14 is head space. The lower storage chamber 14 can be of any suitable volume to allow for the containment, vaporization, and circulation of a sufficient amount of the working fluid 28. In certain embodiments such as an expandable upper storage chamber 20 and/or condenser 18 with delayed condensation at night, the lower storage chamber 14 can be a few hundred gallons by may need to be replenished with working fluid from a reservoir to maintain submersion of the heat exchanger. In one embodiment, the lower storage chamber 14 can have a volume of about ninety percent of the total working fluid in the system if the system is continuously cycling with little storage in the upper storage chamber 20.

In use, the working fluid 28 in the lower storage chamber 14 can be exposed to heat from the LGWH source 30. The LGWH source 30 can be cooling coils from an adjacent compressor transferring heat to the working fluid 28 in the lower storage chamber 14. In certain embodiments, the heat can be transferred indirectly. In certain embodiments, the amount of heat collected by the LGWH source 30 can be steady and sometimes it can be erratic.

Vaporization of the working fluid 28, resulting from exposure to the LGWH source 30, can occur at a liquid-air interface 32. Vapor can exit through an outlet 34 of an upper portion of the lower storage chamber 14 to enter a lower end of the first column 16, fluidly connected to the lower storage chamber 14. The first column 16 allows for vapor to rise upwardly toward the condenser 18. In certain embodiments, a fan, valve, diaphragmatic oscillation caused by wind, or other active or inactive devices on the first column 16 can facilitate upward movement of vapor through the first column 16. In other embodiments, a pump (not shown) can be utilized. Nonetheless, in some embodiments, the condenser 18 can generate a vacuum by reducing a volume of the vaporized working fluid in a closed space, thereby expediting the flow of additional vaporized gas from the first column 16. The first column 16 can be of any size suitable to receive a sufficient amount of vapor from the lower storage chamber 14 and guide or allow movement of the same to the condenser 18, which is fluidly connected thereto and can receive the working fluid 28 and allow the same be cooled to liquid form. In certain embodiments, the first column 16 can have a height from the height of the building or a tower but it will be appreciated that a first column height and size may be configured to adapt to specific environments in which the LGWH recovery system is located. The first column 16 can be insulated to prevent premature condensation of the vapor traveling therethrough.

The condenser 18 can have a dual function in various embodiments. Besides condensing the working fluid 28, it may retain the gaseous form of the working fluid 28 to utilize lower ambient temperatures at a later time for condensation. Alternatively, a buyer may choose to have a separate remotely-controlled active condenser attached to this condenser 18 to expedite the formation of liquid working fluid 28 for energy generation. For example, a utility or solar farm operator may choose to spend a little energy to create more energy during peak demand in the evening. At this time, the ambient temperature around condenser 18 may not be ideal for the power requirements of the buyer. In certain embodiments, the condenser 18 can have a volume from about a 10-gallon box to about fifty times the size of hot air balloon. For example, a high floating condenser 18 with continuous heat from a server farm may need a small, efficiency condenser 18. For generating power from a large solar farm or a desert environment, a large condenser 18 would be required. In the case of large condenser 18, it would be designed to minimize drag from air. The condenser 18 may be maintained at ambient temperatures to allow for condensation of the vapor. The range of temperatures for use in the condenser 18 can be dependent upon the working fluid 28 used within the system 10. In certain embodiments, the temperature of the condenser may range from over 100° C. to about 2° C. In a desert environment, for example, the hot sand may push temperatures high and radiation from the sun onto the condenser may keep it hot as well. At night in a desert or in the example of the floating array, the temperature of the condenser will be much lower. In certain embodiments, the condenser 18 can be located at a high elevation, such that less energy is required to maintain cooler temperatures. Nonetheless, the condenser 18 may alternatively or additionally be cooled, passively or actively, by other known methods, such as, for example, a compressor. For example, an existing and operating air conditioner compressor on the roof of a high-rise building 17 may be co-opted into this system such that condensed liquid falls to the bottom of the building to generate electricity while it vaporization inside the building enables cooling and the flow of mass back to the roof.

Condensed working fluid 28 can be transferred to an upper storage chamber 20. This would likely occur via gravity since the condenser 18 would be at a higher altitude. Transfer of the working fluid 28 may occur by any known method for transferring liquids. In one embodiment, the upper storage chamber 20 may be located at an elevation lower than the condenser 18 to allow for a gravity-induced transfer of the working fluid 28. In another embodiment, one or more pumps (not shown) can be used to effect transfer of the working fluid 28. The upper storage chamber 20 can be of any suitable volume to receive from the condenser 18 and store a sufficient amount of the working fluid 28. In certain embodiments, the upper storage chamber 20 can have a volume of from a hundred gallons to thousands of gallons. The upper storage chamber 20 can be maintained at a temperature range of that is between its freezing and boiling point to ensure proper storage of the working fluid 28.

Upon demand, working fluid 28 can be released from an outlet 36 of the upper storage chamber 20 to the second column/conduit 22. The second column/conduit 22 can allow for working fluid 28 to travel downward toward the turbine 24, thereby causing the turbine 24 to rotate. The condenser 18, the upper storage chamber 20, the second column 22, and the turbine 24 can all be fluidly connected. While FIG. 1 depicts an upper storage chamber, however, it will be appreciated that in certain embodiments, liquid working fluid in a LGWH recovery system can proceed directly from a condenser to a turbine. In order to allow for sufficient conversion of potential energy, the upper storage chamber 20 can be positioned at an elevation substantially higher than the second column/conduit 22 and the turbine 24. In certain embodiments, a valve can be opened and closed remotely to facilitate transfer of the working fluid 28 to the second column/conduit 22. The second column/conduit 22 can be of any size suitable to receive a sufficient amount of working fluid 28 from the upper storage chamber 20 and allow for appropriate transfer of the same to the turbine 24. In certain embodiments, the second column/conduit 22 can have a height and/or length from hundreds of feet to thousands of feet, but it will be appreciated that a height, length and size of a second column/conduit may be configured to adapt to specific environments in which a LGWH recovery system is located, e.g. a high-rise building. As with the first column 16, the second column/conduit 22 can be insulated to maintain an appropriate temperature for the working fluid 28 during transfer of the same.

In operation, the falling working fluid 28 can contact turbine blades to turn the turbine 24, resulting in the production of electricity and recovery of energy that would have otherwise been lost as heat waste. When electricity is mentioned in this disclosure, it can be inferred to be any type of power since electricity can be converted from one power source to another power source. Suitable types of turbines can include any known turbines or other devices that transfer mechanical displacement into electrical power. Such turbines may be impulse or reaction types. In one embodiment, the turbine 24 is a Pelton turbine which is suited for high head and low flow applications. Subsequently, working fluid 28 passing through the turbine 24 can be collected and returned to an inlet 38 of the lower storage chamber 14 via a return duct 26. In certain embodiments, the working fluid 28 can act as a coolant for the LGWH source 30, such that regulation of a temperature of the LGWH source 30 can be facilitated.

The main limiting parameters of this system are an input temperature determined by the LGWH source 30 and an output temperature at the condenser 18. Based on the input and output temperatures and the specific working fluid 28, portions of the closed system 10 (e.g., lower storage chamber 14) can be vacated of air and a set pressure is established and the chamber is closed. The desired air constituents can be determined at this time. Pressure at various points throughout the LGWH system 10 may be altered to affect a boiling point of the working fluid 28 such that the boiling point is below a temperature of the LGWH source 30 and above a temperature of the condenser 18. Such modulation of the boiling point of the working fluid can be conducted dynamically and remotely. Any person skilled in the field can conceive of multiple ways to alter the volume of a closed system to alter its pressure. Adjusting the pressure can be particularly beneficial, for example, to allow for continuous operation through diurnal and seasonal temperature fluctuations. Suitable pressures for the chamber, column, and/or condenser can range can vary depending on the characteristics of the working fluid, temperature of the waste heat, temperature at the condenser, and the initial pressure set for the closed system. The initial pressure is set to lower the boiling point of the working fluid below the waste heat temperature but below the temperature of at the condenser (i.e., ambient temperature). Therefore, the suitable temperature for the entire system, and therefore, pressure, will be dependent on these two independent temperature variables. Further, such air constituents can such as oxygen, nitrogen, carbon dioxide, water vapor, etc. can modulate the internal pressure since they can respond to ambient temperatures. Water vapor can condense, for example. Therefore, the possibility of completely vacating the closed chamber and introducing a single gas may be desirable in practice.

Figure 2:
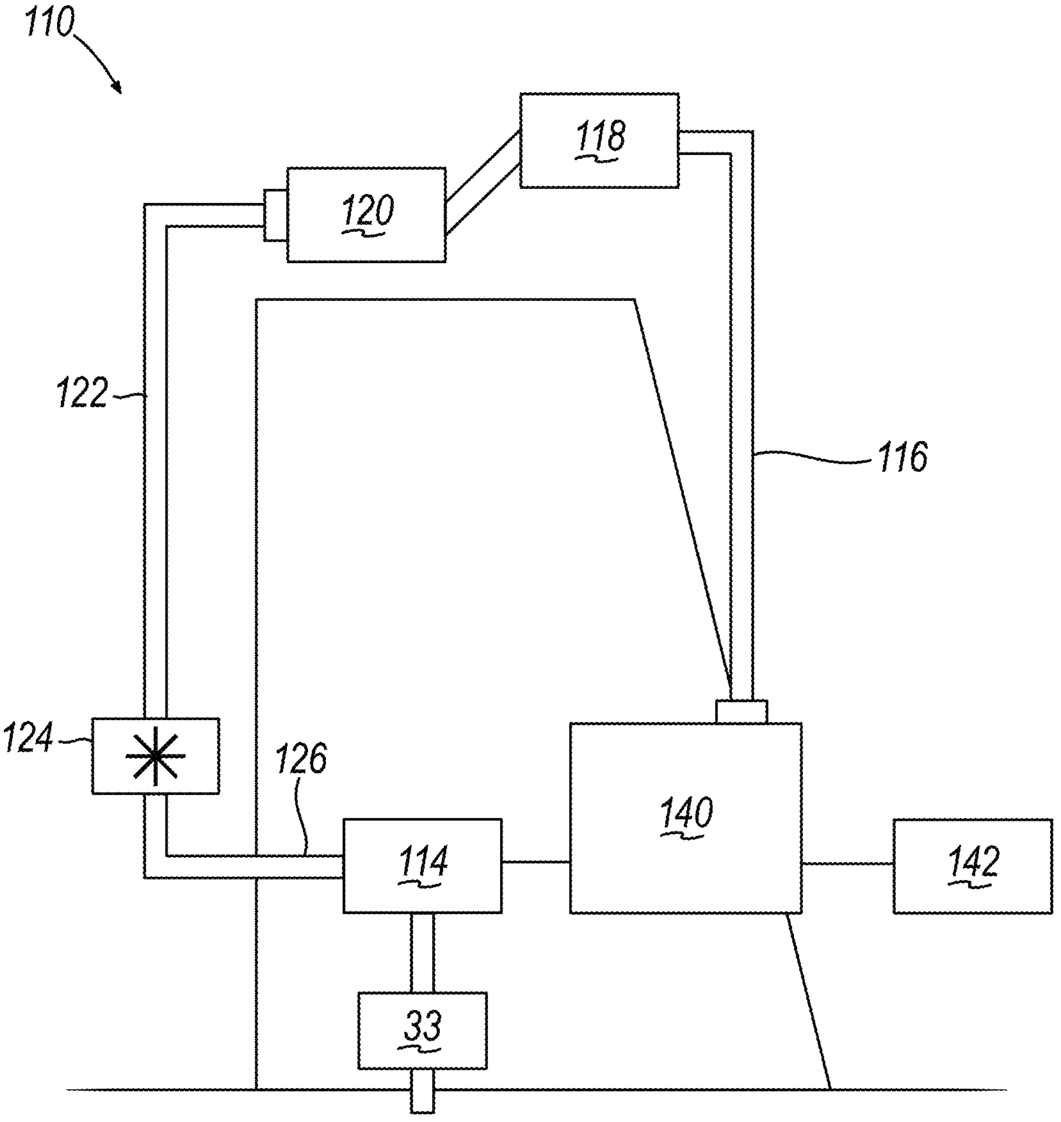
FIG. 2 depicts a schematic view of a LGWH recovery system, according to another embodiment, with a gas turbine generator molded to the side of hill or mountain and powered by heat from geothermal sources.

FIG. 2 depicts a LGWH system 110 located on the side of a mountain, in accordance with another embodiment, to recover heat from geothermal sources. In particular, the LGWH system 110 relates to a robust system that can provide a high level of heat waste recovery at high temperatures. For example, and as shown in FIG. 2, the first column 116 can include a gas turbine 140. In operation, vaporized working fluid 128 exiting the lower storage chamber 114 can enter the first column 116 and proceed to effect rotation of the gas turbine 140, which can be connected to a generator 142. Vaporized working fluid will continue to travel up the first column 116, into the condenser 118, and throughout the system 110 as described above. In such embodiments, heat waste can be used to generate electricity by two separate mechanisms. Heat pump 33 can be used to regulate the flow of geothermal heat into the lower storage chamber 114. While FIG. 2 is shown to be positioned on the side of a mountain, it will be appreciated that a LGWH system can be positioned in any suitable location in which a natural elevation can be utilized.

Figure 3:
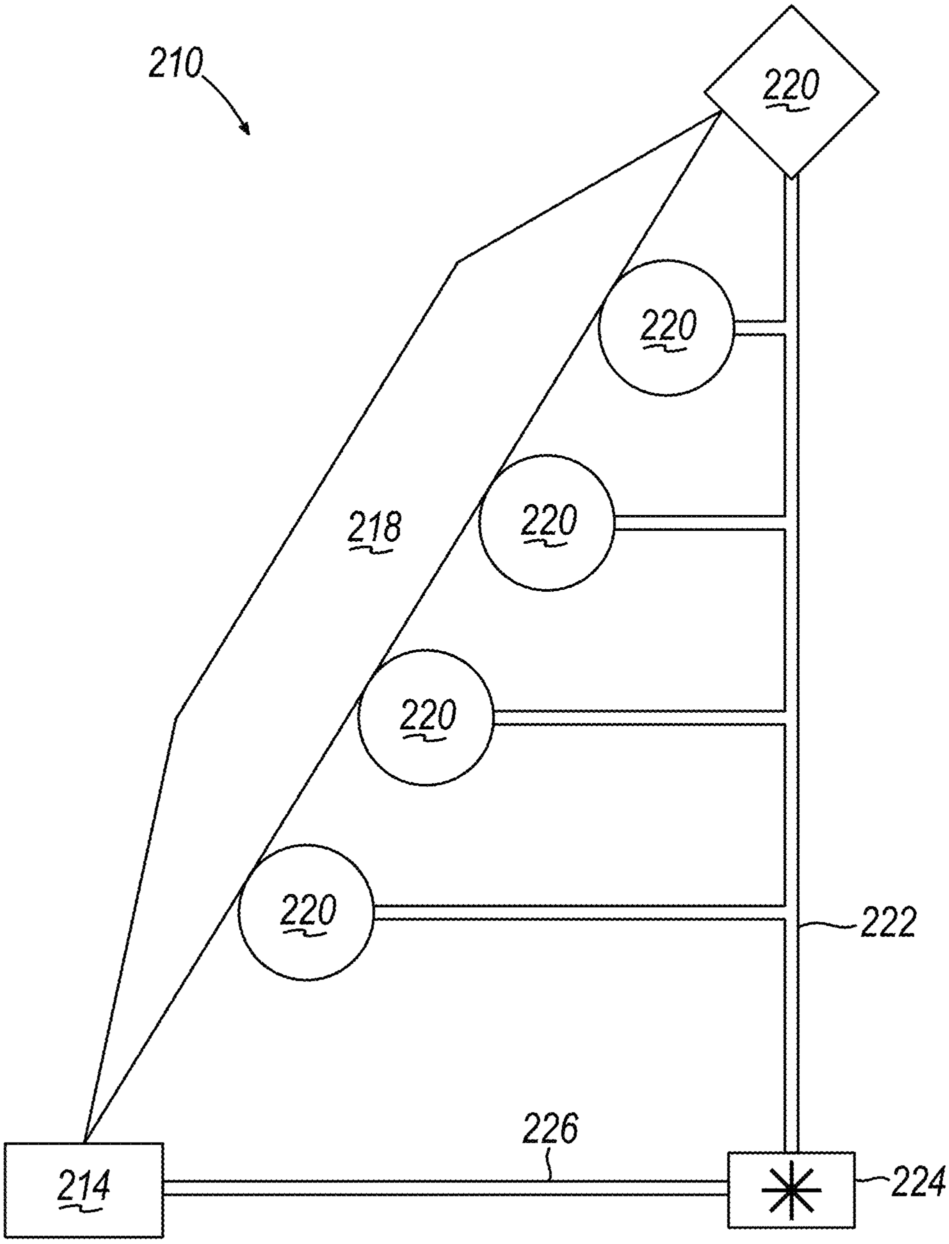
FIG. 3 depicts a schematic view of a LGWH recovery system, according to another embodiment, using waste heat allowing for the capture of energy from condensed vapor along the path of the vapor by employing a floating condenser.

FIG. 3 depicts a LGWH system 210, in accordance with another embodiment. LGWH systems can include alternate condenser configurations including, for example, a moving condenser, an expansive condenser, or a series of condensers. In FIG. 3, for example, the LWGH system 210 can include a floating condenser 218, in place of a first column, to allow condensed working fluid 228, wherever it may occur, to be captured and received by the upper storage chambers 220 at various elevations, to preserve its potential energy. The floating condenser 218 can be expandable. In one embodiment, and as shown in FIG. 3, the floating condenser 218 can be movable between a first position, at which the floating condenser 218 can receive the working fluid 228 in vapor form from the primary storage chamber 214, and a second position, such that the upper storage chambers 220 can be located at different positions between the first and second positions. As shown in FIG. 3, the second position can be at a higher elevation than the first position. The working fluid 228 can be released from the upper storage chambers 220 and directed to the turbine 224 via a central conduit 222, whereby the turbine 224 can be caused to rotate by the working fluid 228 descending from the upper storage chambers 220. In such embodiments, the need for an insulated first column is obviated. The floating condenser 218 can be similar to an inflatable bag and can be raised by a balloon in addition to the vapors inside. The vapors of the working fluid 228 travel in the expandable floating condenser 218 to their maximal height prior to condensation. In situations such as in rural towns with variable waste heat source(s) and variable external temperature and pressures, this system captures the energy in LGWH sources. It will be appreciated that additional turbines can be employed.

Figure 4:
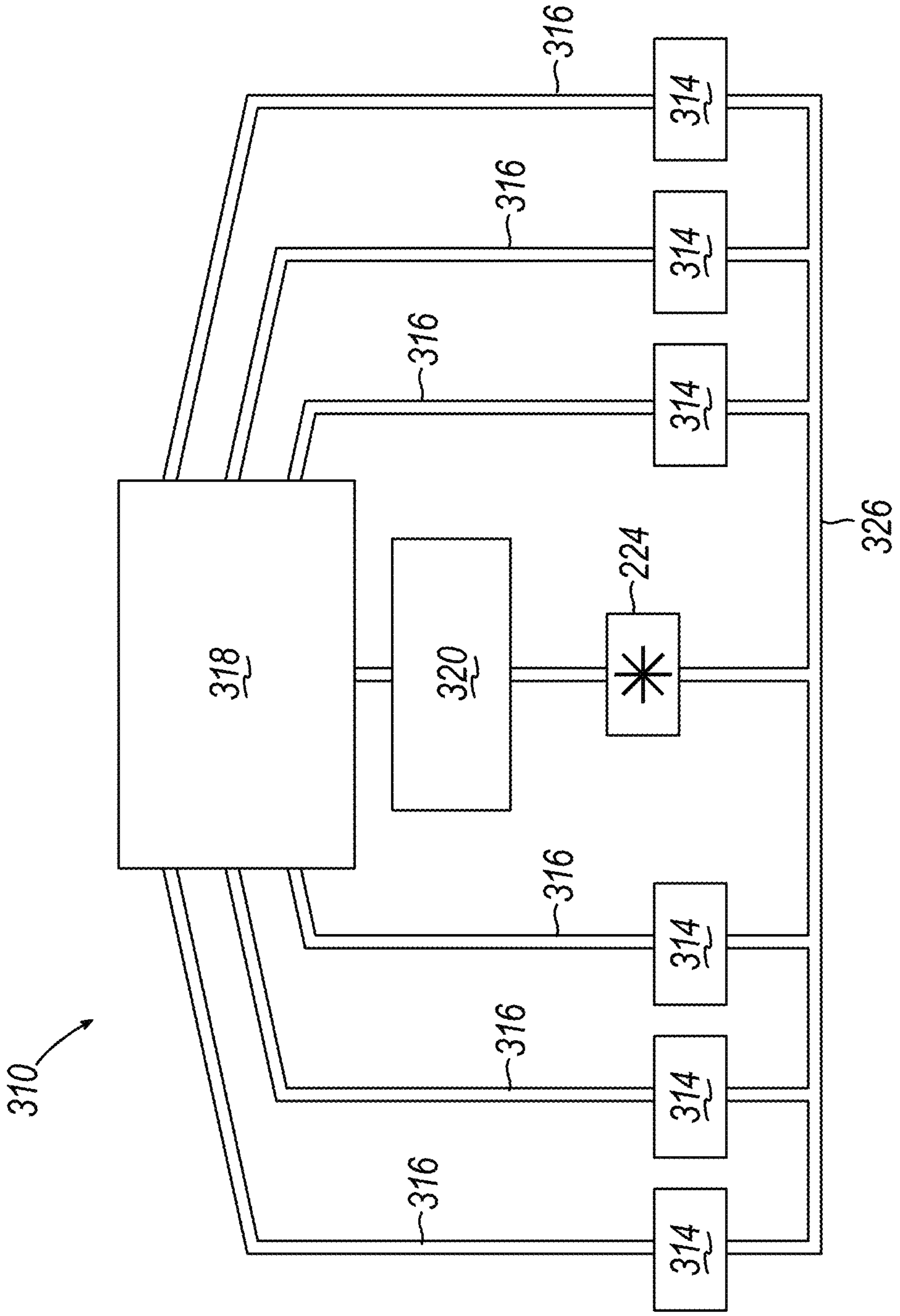
FIG. 4 depicts a schematic view of a LGWH recovery system, according to another embodiment, using waste heat indicating how it can be deployed in a distributed manner in a large factory or a city with multiple heat spots, with multiple lower storage chambers.

In certain embodiments, ratios between various components may not be 1:1 as depicted, for example, in FIG. 1. In certain embodiments, a LGWH system (e.g., 310) can include a plurality of lower storage chambers connected to a singular condenser. FIG. 4 depicts a LGWH system 310, in which multiple lower storage chambers 314 and columns 316 can be directed to a centralized receiving point (i.e., condenser 318 and upper storage chamber 320. In such an embodiment, and as shown in FIG. 4, the centralized receiving point can be directed to a singular turbine 324 before the working fluid 328 can be collected by multiple return ducts 326 and returned to the multiple lower storage chambers 314. Such a configuration may be desirable as turbines can be one of the most expensive parts of a LGWH system or other hydropower system. It will be appreciated that any of a variety of suitable configurations may be provided, such that a LGWH system can be adapted to the environment in which it is to be constructed. That is, while FIG. 4 shows a singular condenser 318, upper storage chamber 320, and turbine 324, other LGWH systems may include two or more of such components capable of receiving working fluid from multiple lower storage chambers. In a city, for example, heat waste, and thus, vaporization points (e.g., lower storage chambers) can be widely available. In such embodiments, LGWH systems can include multiple vaporization points and a more limited number of receiving points for use with one or more centralized turbines. Given that electricity generation can result in copious amounts of LGWH, the LGWH systems described herein can improve the efficiency of electricity generation. Thus, the LGWH systems can likewise facilitate the decentralization of electricity generation to reduce inefficiencies and power loss due to transmission and distribution.

In certain embodiments, the LGWH systems described herein can improve the efficiency of electricity generation from non-renewable energy sources as well as from solar panels. For example, and as described herein, working fluid within a LGWH system can serve as a coolant. In certain embodiments, such cooling feature can be configured for use with IT equipment and facilities. Conventional heat recovery systems require a supplemental energy source to cool working fluid. In certain embodiments, however, LGWH systems can recovery energy from waste heat without an additional energy source.

Figure 5:
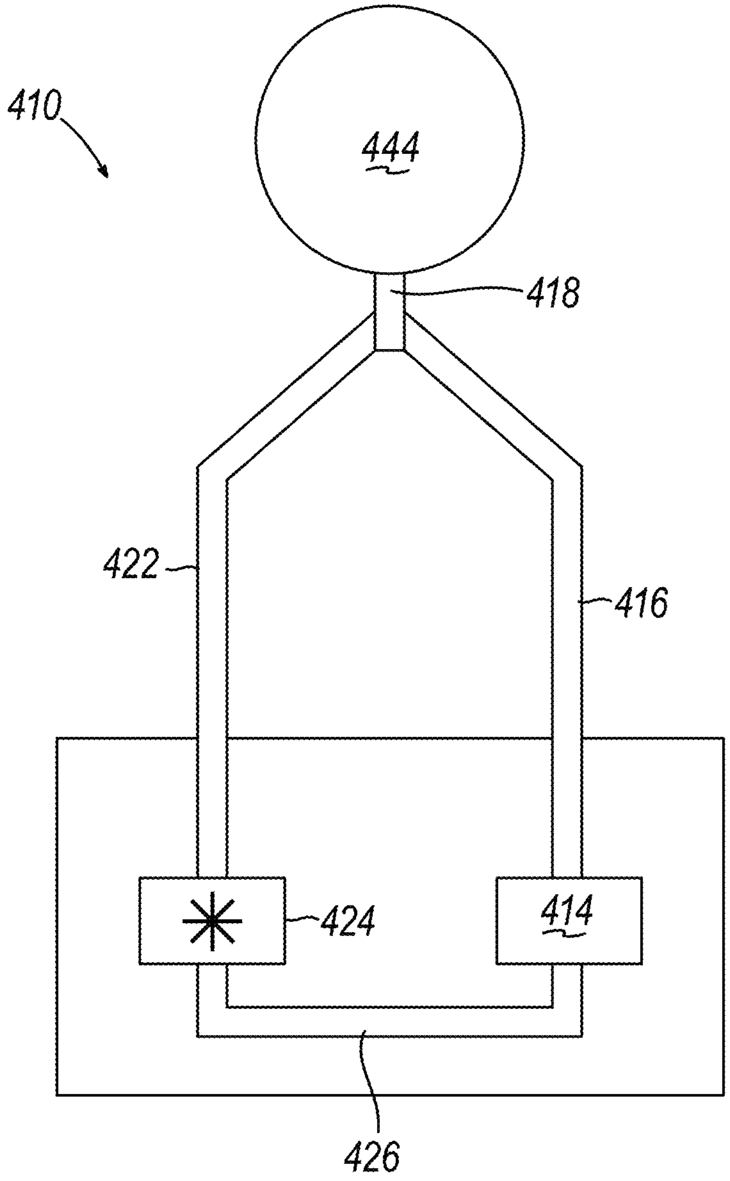
FIG. 5 depicts a LGWH recovery system, according to another embodiment, having a low-density condenser connected to an expandable, floatation balloon.

The LGWH system 410 can be associated with, for example, a data center or a large low-rise building. FIG. 5 shows that the LGWH system 410 can further include a low-density condenser 418 connected to a floatation balloon 444 that receives working fluid vapors from the ascending column 416. In operation, the low-density heat exchanger 418 can receive and direct ambient air to an upper portion of the same and into the floatation balloon 444. The floatation balloon 444 can be configured like a hot air balloon to elevate the low-density condenser 418 as a result of warm air rising continuously from the low-density heat exchanger 418. It is possible the floatation balloon 444 and the heat exchanger are one unit. The condensed working fluid descends along the descending column 422 to the turbine 424 before returning to the lower storage chamber 414. In this embodiment, there is no upper storage chamber and the low-density heat exchanger is not expandable. Therefore, the condensed working fluid descends directly towards the turbine. In the scenario, a stable flow of LGWH is expected and a stable output of power is desired.

Figure 6:
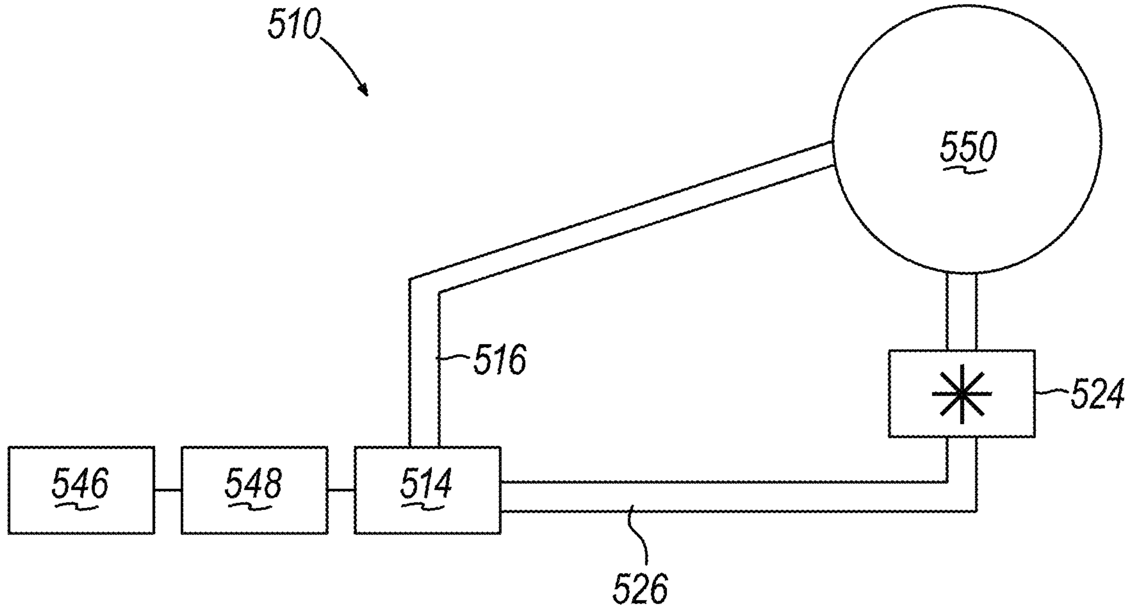
FIG. 6 depicts a LGWH recovery system, according to another embodiment, used in combination with solar panels.

As shown in FIG. 6, the LGWH system 510 can be configured for use with a solar panel 546. In certain embodiments, a heat exchanger 548 can be coupled to a reverse side of the solar panel 546. It will be appreciated that a solar panel suitable for use with the LGWH system 510 may be any of a variety of known solar panels in any of a variety of suitable shapes and sizes. The lower storage chamber 514 can be connected to the heat exchanger 548 on an opposite side thereof. In use, the working fluid 528 from the lower storage chamber 514 can be routed to the heat exchanger 548 via capillary action and the pressure differential (i.e., vacuum) created by the vaporization of existing working fluid 528 in the heat exchanger 548 and vaporized at a set temperature to facilitate regulation of a temperature of the solar panel. In such embodiments, the LGWH system 510 can capture thermal energy from solar radiation and optimize the function of the solar panels. In certain embodiments, this thermal energy can be stored for use in the evening or overnight. In operation, the vaporized working fluid 528 can elevate to an inflatable balloon 550 at a higher elevation for storage, such that the working fluid can be used to create energy at a later time. The gaseous working fluid may stay in the balloon 550 until the desirable ambient temperature is present to cause condensation. The balloon 550 may have a volume of from about one hot air balloon to about fifty hot air balloons. It will be appreciated that the balloon 550 can be formed from any of a variety of materials suitable for the containment of vaporized working fluid, including, for example, low density polyethylene.

Figure 7:
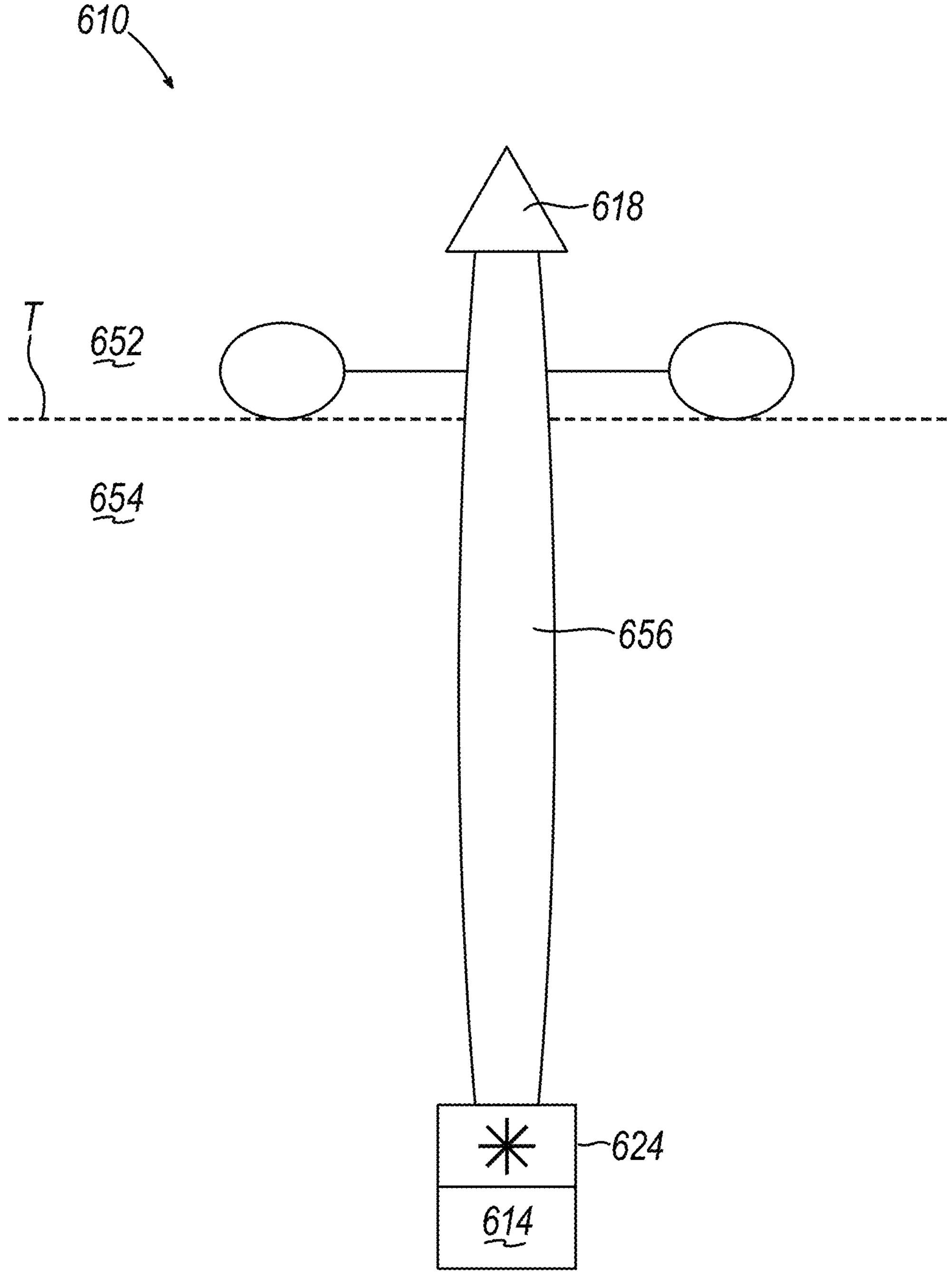
FIG. 7 depicts how a LGWH recovery system can be used to power a floating heat pipe in the earth's stratosphere to allow LGWH to more easily escape into space.

FIG. 7 indicates how this LGWH recovery system can be made into a floating station to funnel heat into the stratosphere 652 from the lower atmosphere (i.e., troposphere 654) to minimize the impact of global warming. Along the boundary of tropopause T, the LGWH recovery system 610 is situated since the cold, calm region of the stratosphere 652 offers a desirable stable setting. The lower storage chamber is called a vaporizer 614 since the objective is not to hold liquid working fluid, but to create a constant flow—i.e. constant vaporization. Upon vaporization, the working fluid vapor bypasses the turbine 624 on the outside to ascend on the periphery of the long vertical column 656. Upon reaching the condenser 618, the working fluid condenses and descends in the center of the long vertical column 656 onto the turbine 624 and back into the vaporizer 614. The power generated can be used operate various instruments at the tropopause T. Such instruments can be for navigational purposes or providing market oriented services.

What is claimed is:

1. A low-grade waste heat ("LGWH") recovery system, comprising:

a primary storage chamber comprising a working fluid and configured to receive waste heat from a heat source to heat the working fluid from a liquid form to a vapor form;

a floating condenser movable between a first position, at which the floating condenser is configured to receive the working fluid in vapor form from the primary storage chamber, and a second position, the floating condenser being configured to cool the working fluid back to liquid form, wherein the condenser is expandable;

two or more secondary storage chambers, each of the secondary storage chambers configured to receive the working fluid from the floating condenser at a different position between the first and second positions, wherein each of the secondary storage chambers are positioned at different elevations;

a primary turbine configured to receive the working fluid from at least one of the two or more secondary storage chambers and configured for rotation caused by descent of the working fluid therefrom;

wherein the LGWH recovery system is a closed system.

2. The LGWH recovery system of claim 1, wherein the second position is at a higher elevation than the first position.

3. The LGWH recovery system of claim 1, wherein the working fluid from each of the secondary storage chambers is collected in a central conduit configured to guide the working fluid to the primary turbine.

4. A method of recovering energy, the method comprising:

connecting the primary storage chamber of the LGWH recovery system of claim 1 to the heat source;

recovering energy produced by rotation of the primary turbine.

5. The LGWH recovery system of claim 1, wherein the working fluid is water.

6. The LGWH recovery system of claim 1, wherein heat is transferred from the heat source to the primary storage chamber via coils, and wherein the working fluid is exposed to the coils.

7. The LGWH recovery system of claim 1, wherein the first position is at a higher elevation than the primary storage chamber.

8. The LGWH recovery system of claim 1, wherein the heat source is geothermal heat.

* * * * *